UNITED STATES PATENT OFFICE.

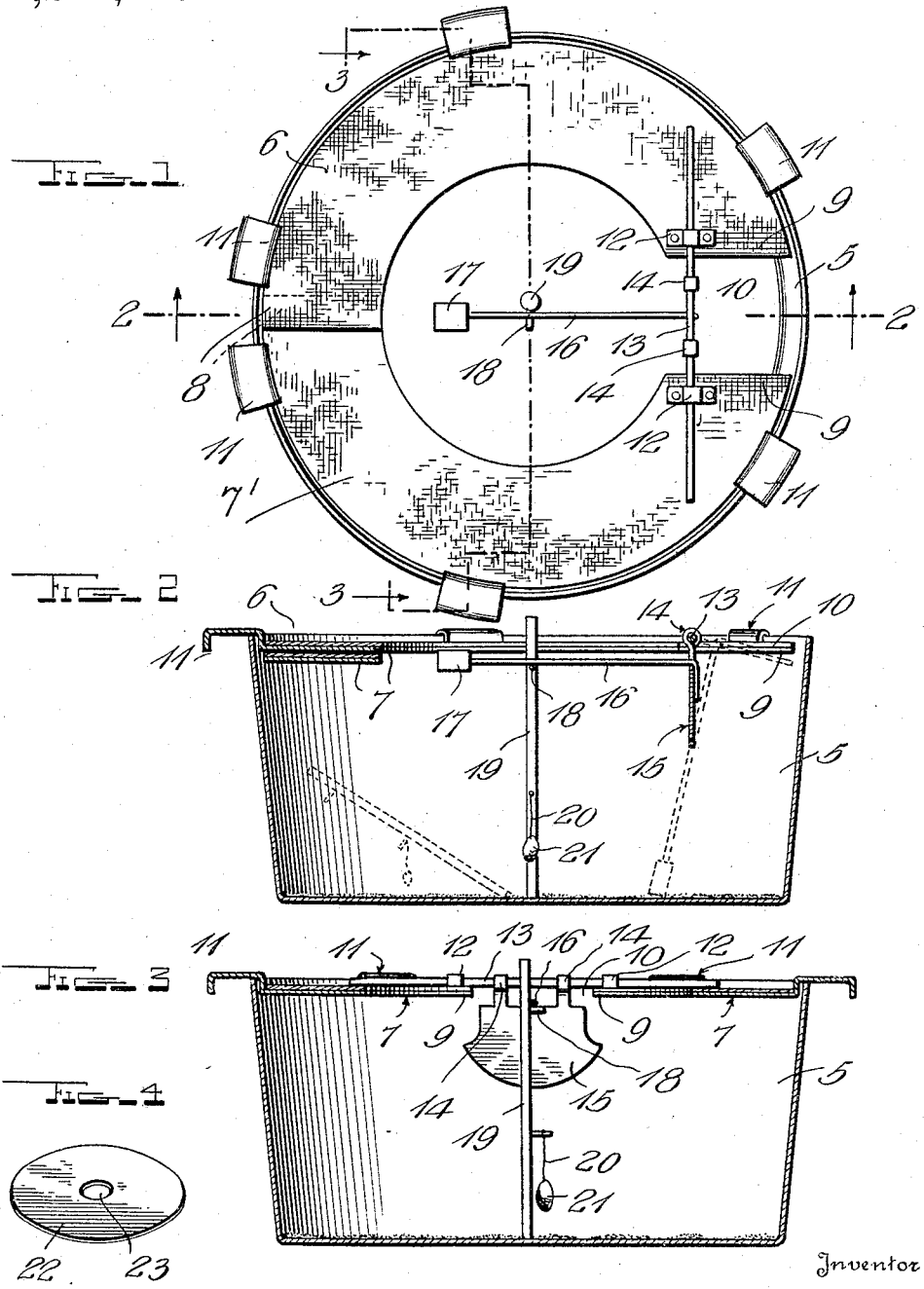

EDWARD P. LE COMPTE, OF PARK CITY, UTAH.

ANIMAL-TRAP.

1,203,210.  Specification of Letters Patent.  Patented Oct. 31, 1916.

Application filed April 17, 1915. Serial No. 22,093.

*To all whom it may concern:*

Be it known that I, EDWARD P. LE COMPTE, citizen of the United States, residing at Park City, in the county of Summit and State of Utah, have invented certain new and useful Improvements in Animal-Traps, of which the following is a specification.

My invention relates to improvements in animal traps, particularly those designed for catching rats or mice.

An important object of the invention is to provide means of the above mentioned character embodying an adjustable top member adapted to be secured upon receptacles, such as buckets or the like, of different sizes.

A further object of the invention is to provide apparatus of the above mentioned character which is simple in construction, inexpensive to manufacture, and convenient in use.

Other objects and advantages of the invention will be apparent during the course of the following description.

In the accompanying drawings forming a part of this specification and in which like numerals are employed to designate like parts throughout the same, Figure 1 is a plan view of apparatus embodying my invention, Fig. 2 is a vertical sectional view taken on line 2—2 of Fig. 1, Fig. 3 is a similar view taken on line 3—3 of Fig. 1, and, Fig. 4 is a perspective view of a removable plate.

In the drawings, wherein for the purpose of illustration is shown a preferred embodiment of my invention, the numeral 5 designates a receptacle, shown as a pail or bucket circular in cross-section. It is to be understood that the invention is in no sense restricted to any particular type or shape of receptacle, as a square box or the like may be used, if desired.

My apparatus embodies an adjustable top member or flange 6, formed in a plurality of sections or segments 7, covered with cloth $7^1$, to prevent frightening the animal, and having corresponding ends 8 preferably overlapping, and opposite corresponding ends 9 spaced for providing an opening 10 through which the animal enters the receptacle 5. The invention is in no sense restricted to the shape of the sections 7, as shown, as their shape is controlled by the shape of the receptacle upon which they are designed to be mounted. These adjustable sections 7 are provided with downwardly bent hooks or holding members 11, adapted to receive the upper end of the receptacle 5, as shown.

Secured to the sections 7 adjacent the ends 9 thereof, and preferably arranged upon the upper sides thereof, are straps or brackets 12, which receive a removable rod 13, upon which the straps 12 may be longitudinally adjusted. The rod 13 is arranged adjacent the inner side of the opening 10 and has straps or knuckles 14 pivoted thereon, carrying a vertically swinging door 15, adapted to open and close the opening 10.

Rigidly connected with the door 15 is a preferably cylindrical arm or lever 16, having a weight 17 attached to its free end. When the arm 16 is in the upper position, the door 15 is in the lower or vertical position, as shown. The arm 16 is held elevated by a pin or extension 18, attached to the upper end of the support rod 19, passing upwardly between the sections 7, with its lower end engaging the bottom of the receptacle 5. Connected with the lower portion of the support rod 19 is a cord or flexible element 20, to which is secured a bait 21. The rod 19 is preferably cylindrical.

The numeral 22 designates a cover-plate, adapted to close the opening between the sections 7 and having an opening 23 for receiving the rod 19. It is ordinarily unnecessary to use this cover-plate, but if the receptacle 5 employed is too shallow, the cover-plate is used to prevent the animal from springing out of the trap.

In the use of the apparatus, the bottom of the receptacle 5 is covered with wheat-flour, the support rod 19 is arranged in the vertical position and the arm 16 placed upon the pin 18, to be suspended thereby. The animal enters the receptacle 5 through the opening 10, and while therein pulls upon the bait 21, whereby the support rod 19 will fall. When this occurs the arm 16 drops, closing the door 15.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described the invention, I claim:

1. In apparatus of the character described, a plurality of segmental cover members adapted to be moved toward and away from each other and carrying holding members adapted to slidably contact with the upper end of a receptacle, a pivoted door connected with the segmental cover members, releasable means to hold the pivoted door in the open position, and means to close the door when released.

2. In an animal trap of the character described, a plurality of approximately segmental cover members adapted to be moved toward and away from each other and carrying holding members adapted to slidably contact with the upper end of a receptacle, corresponding ends of the cover members being arranged adjacent each other and corresponding ends spaced a substantial distance apart to provide an opening, a vertically swinging door mounted within the opening, and means to pivotally connect the door with the adjacent ends of the cover members.

3. Apparatus of the character described, comprising a cover-member embodying a plurality of relatively movable sections having corresponding ends spaced to provide an opening, brackets secured to the sections and adapted to engage with the top of the receptacle, a rod adjustably connected with the sections adjacent the opening, a door pivoted upon the rod, an arm provided with a weight connected with the door to move it, and means to support the arm.

4. Apparatus of the character described, comprising a circumferentially adjustable cover member formed in a plurality of relatively movable sections and having a central opening and provided with down turned hooks to engage with the top of a receptacle, a door pivoted to the cover member, and means to move the door.

5. Apparatus of the character described, comprising a pair of segmental cover members having corresponding ends arranged adjacent each other and opposite corresponding ends spaced a substantial distance for providing an opening, holding members carried by the segmental cover members and adapted to slidably contact with the upper end of a receptacle, a door arranged within said opening, a rod for pivotally supporting the door and having an adjustable connection with the spaced ends of the segmental cover members, an arm having a weight secured thereto and connected with the door, and detachable means for holding the arm elevated.

In testimony whereof I affix my signature in presence of two witnesses.

EDWARD P. LE COMPTE.

Witnesses:
   A. ROY FLETCHER,
   HENRY SHIELDS.

Copies of this patent may be obtained for five cents each, by addressing the "Commissioner of Patents, Washington, D. C."